United States Patent
Hadavi et al.

(10) Patent No.: US 12,113,715 B2
(45) Date of Patent: *Oct. 8, 2024

(54) QUALITY OF SERVICE MANAGEMENT SYSTEM FOR A COMMUNICATION NETWORK

(71) Applicant: Level 3 Communications, LLC, Broomfield, CO (US)

(72) Inventors: Marcus Hadavi, Denver, CO (US); James Ryan, Littleton, CO (US)

(73) Assignee: Level 3 Communications, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/382,201

(22) Filed: Oct. 20, 2023

(65) Prior Publication Data
US 2024/0056394 A1    Feb. 15, 2024

Related U.S. Application Data

(63) Continuation of application No. 17/971,031, filed on Oct. 21, 2022, now Pat. No. 11,799,783, which is a (Continued)

(51) Int. Cl.
*H04L 47/24* (2022.01)
*H04L 45/302* (2022.01)
(Continued)

(52) U.S. Cl.
CPC ............ *H04L 47/24* (2013.01); *H04L 45/302* (2013.01); *H04L 47/2408* (2013.01); *H04L 47/621* (2013.01)

(58) Field of Classification Search
CPC ... H04L 47/24; H04L 45/302; H04L 47/2408; H04L 47/621
See application file for complete search history.

(56) References Cited

U.S. PATENT DOCUMENTS 7,565,436 B2   7/2009  Rabie
9,007,899 B2   4/2015  Kotecha
(Continued)

FOREIGN PATENT DOCUMENTS

EP    3203770 A1 *  8/2017  ............. H04B 17/00

OTHER PUBLICATIONS

Extended European Search Report, dated Nov. 29, 2017, Application No. 15792843.3, filed May 14, 2015; 5 pgs.
(Continued)

*Primary Examiner* — Lan-Huong Truong (57) ABSTRACT

A quality of service management system includes a rules engine that receives information associated with a communication path having an assigned quality of service (QoS) to be provided for a customer communication device, and identifies one or more network elements assigned to provide the communication path. Each network element having a plurality of queues configured to provide varying QoS levels relative to one another. For each of the network elements, the rules engine determines at least one queue that is configured to provide the communication path at the assigned quality of service, and transmits queue information associated with the determined queue to its respective network element, the network element conveying the communication path through the determined queue.

15 Claims, 5 Drawing Sheets

Related U.S. Application Data continuation of application No. 17/197,820, filed on Mar. 10, 2021, now Pat. No. 11,483,247, which is a continuation of application No. 16/518,416, filed on Jul. 22, 2019, now Pat. No. 10,951,534, which is a continuation of application No. 15/645,449, filed on Jul. 10, 2017, now Pat. No. 10,361,960, which is a continuation of application No. 14/320,043, filed on Jun. 30, 2014, now Pat. No. 9,705,805.

(60) Provisional application No. 61/994,531, filed on May 16, 2014.

(51) Int. Cl.
*H04L 47/2408* (2022.01)
*H04L 47/62* (2022.01)

(56) References Cited

U.S. PATENT DOCUMENTS

| | | | |
|---|---|---|---|
| 2002/0075814 A1* | 6/2002 | Desai | H04L 47/829 |
| | | | 370/255 |
| 2002/0126633 A1 | 9/2002 | Mizutani et al. | |
| 2003/0179703 A1 | 9/2003 | Levy | |
| 2004/0100903 A1 | 5/2004 | Han et al. | |
| 2005/0185582 A1 | 8/2005 | Wybenga et al. | |
| 2006/0133368 A1 | 6/2006 | Tolliver | |
| 2007/0189293 A1 | 8/2007 | Yamada et al. | |
| 2007/0192862 A1 | 8/2007 | Vermeulen | |
| 2009/0310610 A1 | 12/2009 | Sandstrom | |
| 2010/0195503 A1 | 8/2010 | Raleigh | |
| 2011/0261831 A1* | 10/2011 | Sharma | H04L 47/17 |
| | | | 370/412 |
| 2012/0127973 A1 | 5/2012 | Lin | |
| 2012/0155264 A1 | 6/2012 | Sharma | |
| 2012/0155298 A1* | 6/2012 | Yang | H04W 24/08 |
| | | | 370/252 |
| 2012/0218890 A1 | 8/2012 | Gerkis | |
| 2012/0257893 A1 | 10/2012 | Boyd | |
| 2013/0254412 A1* | 9/2013 | Menezes | H04L 43/026 |
| | | | 709/228 |
| 2013/0329550 A1 | 12/2013 | Kotecha et al. | |
| 2014/0146682 A1* | 5/2014 | Kakadia | H04L 47/805 |
| | | | 370/238 |
| 2014/0269379 A1* | 9/2014 | Holbrook | H04L 47/30 |
| | | | 370/252 |
| 2015/0334026 A1 | 11/2015 | Hadavi et al. | |
| 2015/0355934 A1 | 12/2015 | Yin | |
| 2017/0310599 A1 | 10/2017 | Hadavi et al. | |
| 2019/0342220 A1 | 11/2019 | Hadavi | |
| 2021/0194813 A1 | 6/2021 | Hadavi | |
| 2023/0040538 A1 | 2/2023 | Hadavi | |

OTHER PUBLICATIONS

International Preliminary Report on Patentability, dated Nov. 22, 2016, Int'l Appl. No. PCT/US15/030837, Int'l Filing Date May 14, 2015; 6 pgs.

International Search Report, dated Aug. 20, 2015, Int'l Appl. No. PCT/US15/030837, Int'l Filing Date May 14, 2015; 3 pgs.

Written Opinion of the International Searching Authority, dated Aug. 20, 2015, Int'l Appl. No. PCT/US15/030837, Int'l Filing Date May 14, 2015; 4 pgs.

Wang, Yuke et al., "A-Serv: A Novel Architecture Providing Scalable Quality of Service", *IEEE Communications Society* Globecom 2004; vol. 2, XP010757721 Nov. 29, 2004, pp. 1295-1299.

* cited by examiner

QUALITY OF SERVICE MANAGEMENT SYSTEM FOR A COMMUNICATION NETWORK

TECHNICAL FIELD

Aspects of the present disclosure relate to communication networks and, in particular, to a quality of service management system for a communication network.

BACKGROUND

Although traditional communication services have been typically limited to voice communication, today's communication services have expanded to also include data communication (e.g., Internet, e-mail messaging, etc.) and video communication services (e.g., multimedia messaging services (MMS), digital video broadcast services (DVB), etc.). Nevertheless, each of these differing types of communication services have characteristics that vary widely from one another. For example, although data services often require larger throughput rates than the traditional voice communication services, they can also handle relatively higher levels of burstiness without adversely affecting overall quality of service.

There are numerous qualities of communication services that are collectively referred to as a quality of service (QoS). The quality of service of any communication service generally refers to its overall perceived quality. In many cases it would be advantageous to schedule and independently manage communication services, and particularly for those communication services, such as voice, data, and video communication services having characteristics that vary widely from one another. It is with these issues in mind, among others, that various aspects of the present disclosure were developed.

SUMMARY

According to one embodiment of the present disclosure, a quality of service management system includes a rules engine that receives information associated with a communication path having an assigned quality of service (QoS) to be provided for a customer communication device, and identifies one or more network elements assigned to provide the communication path. Each network element has a plurality of queues that are configured to provide varying QoS levels relative to one another. For each of the network elements, the rules engine determines at least one queue that is configured to provide the communication path at the assigned quality of service, and transmits queue information associated with the determined queue to its respective network element, the network element conveying the communication path through the determined queue.

According to another embodiment, a computer-based processing method includes receiving information associated with a communication path to be provided for a customer communication device, and identifying one or more network elements assigned to provide the communication path in which each network element includes multiple queues configured to provide varying QoS levels relative to one another. The method also includes, for each network element, determining at least one queue that is configured to provide the communication path at the assigned quality of service, and transmitting queue information associated with the determined queue to its respective network element such that the network element conveys the communication path through the determined queue.

According to yet another embodiment, code executable on a computing system is operable to perform receiving information associated with a communication path to be provided for a customer communication device, and identifying one or more network elements assigned to provide the communication path in which each network element includes multiple queues configured to provide varying QoS levels relative to one another. The code is further executable to, for each of the network elements, determine at least one queue that is configured to provide the communication path at the assigned quality of service, and transmit queue information associated with the determined queue to its respective network element such that the network may convey the communication path through the determined queue.

BRIEF DESCRIPTION OF THE DRAWINGS

The foregoing and other objects, features and advantages of the disclosure will be apparent from the following description of particular embodiments of the disclosure, as illustrated in the accompanying drawings in which like reference characters refer to the same components throughout the different views. The drawings are not necessarily to scale, emphasis instead being placed upon illustrating the principles of the disclosure.

DETAILED DESCRIPTION

Aspects of a quality of service (QoS) management system described herein provide for management of a communication network to provide communication services that are consistently applied for each of differing types of communication paths through the network. That is, the QoS management system independently manages each of multiple network elements to convey a communication path according to its assigned QoS such that one of multiple levels of service is maintained throughout the communication network. To this end, embodiments of the QoS management system determine mapping information for each network element of the communication network according to an assigned QoS level for each communication path and distributes the mapping information to each network element. Additionally, the QoS management system provides a scheduling mechanism to ensure that the communication paths through each network element are prioritized and processed in an efficient and orderly manner. Other embodiments include a policing mechanism to ensure that maximum throughput rates of each communication path do not exceed terms of service (ToS) agreements previously established between the communication network provider and customers for whom the communication paths are provided.

Figure 1A:
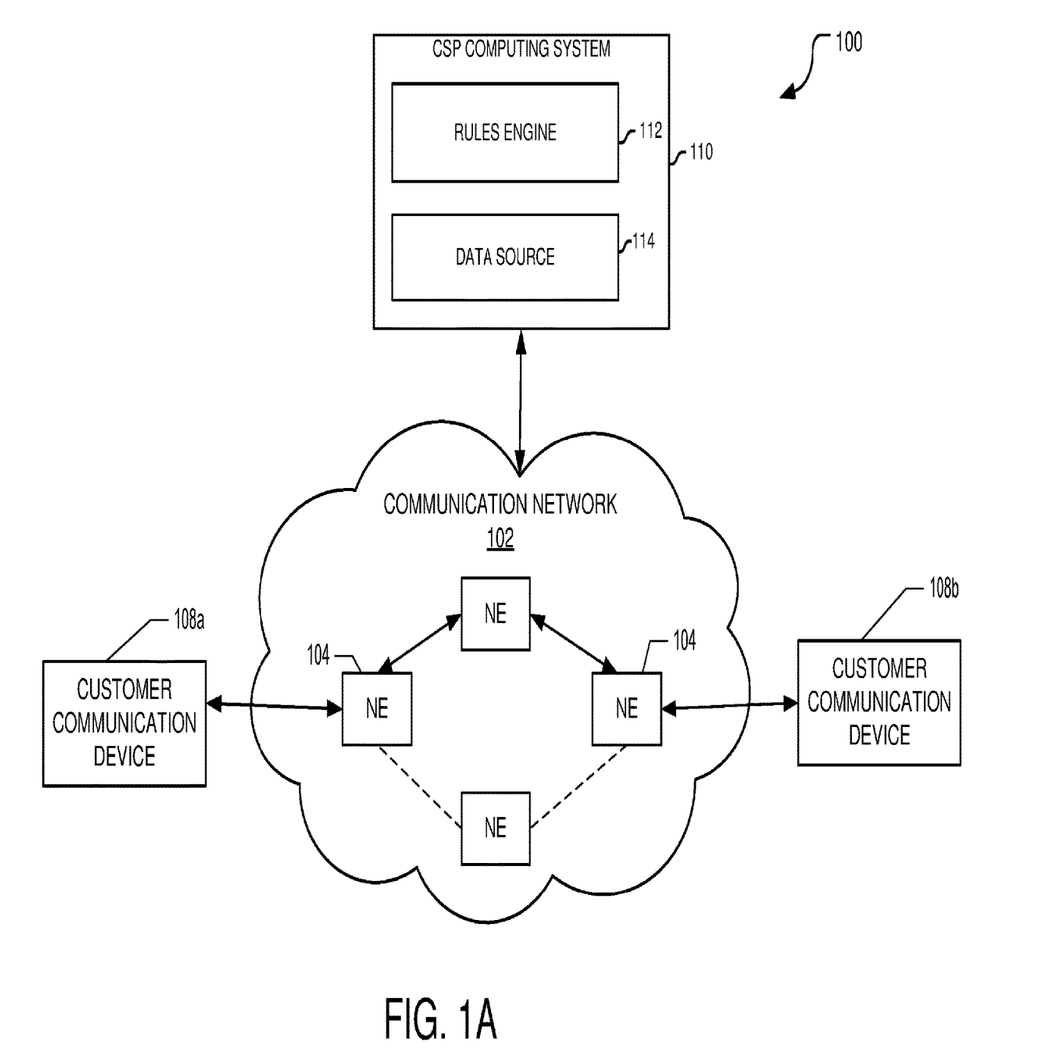
FIG. 1A is a block diagram of an example communication network that implements a quality of service (QoS) management system according to one aspect of the present disclosure.
Figure 1B:
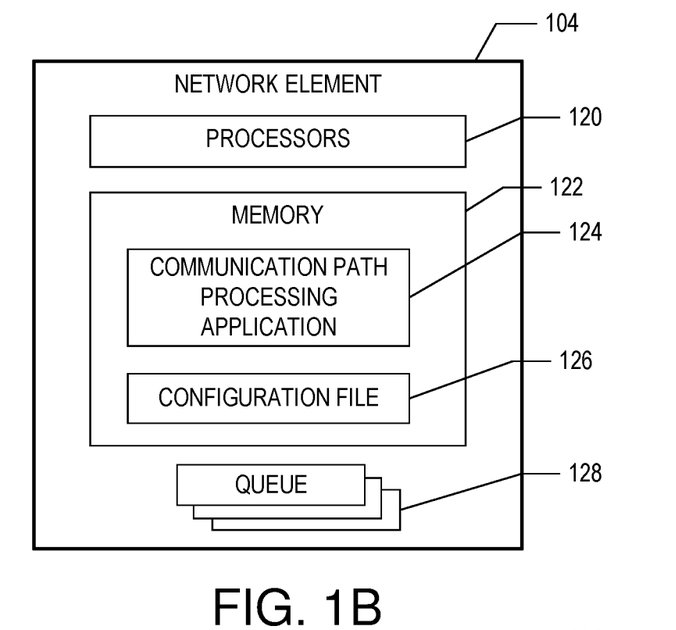
FIG. 1B depicts an example network element according to one aspect of the present disclosure.
Figure 1C:
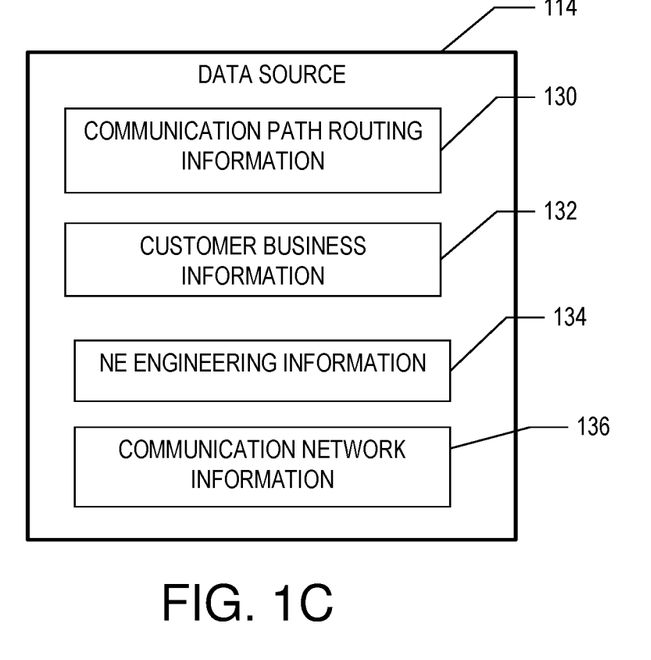
FIG. 1C depicts an example data source according to one aspect of the present disclosure.

FIGS. 1A through 1C depict an example quality of service management system 100 that may be used to manage a communication network 102 according to aspects of the disclosure. Although the particular communication network 102 shown herein is a simplified example, it should be understood that an actual network deploying the concepts described herein may have numerous network elements (NEs) and customer devices using the network.

The communication network 102 has multiple NEs 104 that provide a communication path 106 between a first customer communication device 108a and a second customer communication device 108b. The system 100 includes a communication service provider (CSP) computing system 110 or other computing device or system that includes a rules engine 112 and a data source 114. When a communication path 106 is established through the communication network 102, the rules engine 112 generates provisioning information and distributes the provisioning information to each network element 104 such that an assigned quality of service (QoS) may be maintained for the communication path 106 at each network element 104 along the communication path 106.

The communication network 102 may be any type that provides communication services using one or more network elements 104. In one embodiment, the communication network 102 is an Internet Protocol (IP) based communication network, such as a 'tier 1' communication network that provides varying types of communication services (e.g., voice, data, and video communication services, etc.).

An IP based communication network may include network elements 104, such as packet switches or packet routers that route packets of the communication path 106 according to one or more routing tables stored in the memory of each network element. Other types of network elements 104 may include gateway devices each having a first interface that communicates according to a first protocol, and a second interface that communicates according to a second protocol. A typical gateway may have many interfaces communicating over the same and/or different protocols. The gateway device may be, for example, an ingress network element and/or egress network element that that receives packets from or transmits packet to, respectively, a customer communication device.

Many currently implemented network elements used in IP based communication networks include queuing and scheduling mechanisms for handling multiple communication paths of different types. For example, a particular network element may include a queuing mechanism that is configured to maintain a constant throughput rate required for voice-based communication paths, while maintaining high overall throughput rates for data-based communication paths that can tolerate non constant (e.g., bursty) throughput rates. Examples of queuing mechanisms include those conforming to one or more protocols, such as a differentiated services code point (DSCP) protocol, an Internet protocol (IP) precedence protocol, and a QoS field of a 802.1Q formatted packet header. Nevertheless, because IP based communication networks often include network elements 104 designed and constructed by different vendors, the queuing and scheduling mechanism implemented in each may differ substantially from one another. Embodiments of the present disclosure provide a solution to this problem by using a rules engine 112 that maps standardized quality of service (QoS) values into those understood by each network element 104 such that communication paths may be established having a common QoS across some or all network elements 104 that handle those communication paths. For example, the rules engine 112 may store performance information about some or all NEs in the communication network such that, when a communication path is established, the rules engine 112 may assign queues to each NE handling that communication path such that the communication path's QoS may be consistently maintained through the network. Additionally, tagging of packets may ensure that the QoS for all communication paths configured in the network is consistently maintained.

The customer communication device may be any type that is configured to communicate with the communication network 102 using protocols established for the communication network. For a communication network such as an IP based communication network, the customer communication device 108a communicates with another customer communication device 108b by transmitting and receiving IP based packets that are routed through the communication network 102 along the communication path 106. In one embodiment, the customer communication device 108a and/or customer communication device 108b marks each packet that it transmits to the communication network 102 with a tag indicating a quality of service (QoS) to be assigned to that communication path 106. In another embodiment, an ingress network element functioning as a gateway for a customer communication device 108a, 108b marks each packet that it transmits to the other network elements 104 in the communication network 102 with a tag indicating a quality of service (QoS) to be assigned to that communication path 106. For example, the tag may comprise a three-bit field of an Ethernet frame header conforming to the 802.1Q virtual local area network (VLAN) protocol. Each customer communication device 108a and 108b has one or more processors and executable instructions stored in volatile and/or non-volatile memory for performing the actions and/or steps described herein.

FIG. 1B depicts an example network element 104 according to one aspect of the quality of service management system 100. The network element 104 includes a computing or processing device that includes one or more processors 120 and memory 122 and is to receive data and/or communications from, and/or transmit data and/or communications to, the CSP computing system 110 via wireless, wired, and/or optical communications.

The memory stores a communication path processing application 124 for managing communication paths with the rules engine 112. For example, the application 124 may receive a configuration file 126 from the rules engine 112, which is subsequently stored in the memory 122 and used to configure one or more parameters of the network element 104. The configuration file 126 may include information about which queues 128 are to be used, and how these queues 128 are to be implemented for ensuring an appropriate QoS for each communication path 106. Once configured, the application 124 reads incoming packets to determine their assigned QoS level, and using mapping information provided in the configuration file 126, assign packets to certain queues 128 according to the mapping information. The configuration file 126 may also include information about scheduling of the queues 128 such that load balancing may be maintained. In one embodiment, the configuration file 126 may also include information about whether its respective network element 104 is to perform policing to ensure that policies (e.g., terms of service (ToS) agreements) associated with the communication path are enforced.

The data source 114 stores communication path routing information 130, customer business information 132, network element engineering information 134, and communication network information 136. The communication path routing information 130 stores information about communication paths established through the communication network 102. For example, the communication paths may be dedicated non-transient communication paths (e.g., statically assigned paths) or session dependent communication paths (e.g., dynamically assigned paths). The dedicated paths generally refer to communication paths that are not setup prior to each communication session or torn down after the communication session is completed.

The customer business information 132 stores information about one or more performance parameters to be associated with each communication path and may be, for example, based upon a contractual agreement established between the customer and customer service provider indicating what level of communication services are to be provided. In general, a contractual agreement between the CSP that manages the CSP computing system 110 and a customer of the communication network specifies what services are to be provided and any performance levels associated with these services. For example, the CSP may offer multiple service plans that each provides differing combinations and levels of communication services, such as voice communication services, video communication services, and/or data communication services, such as short messaging services (SMS), multimedia messaging services (MMS), and the like. Additionally, the service plans offered by the CSP may specify varying performance levels associated with each communication service, such as quality of service (QoS) levels, grade of service (GoS) levels, and/or terms of service (ToS) levels. For example, the customer business information 132 may include information about a minimum and/or guaranteed level of throughput to be maintained by the communication path, and a maximum level of burstiness to be exhibited by the communication path.

The network element engineering information 134 stores information about particular characteristics of each network element managed by the rules engine 112. In one embodiment, characteristics may include what queues 128 of each network element 104 are to be used and which queues 128 are to be mapped to corresponding levels of QoS established for the communication network 102. For example, although a particular network element 104 may have 64 queues available for use (e.g., DSCP queue mapping), the network element engineering information 134 may indicate that only six (6) of those queues are to be used. Additionally, the network element engineering information 134 may also indicate how those six queues are mapped to the QoS levels established for use in the communication network 102.

The communication network information 136 stores information about how policies of the rules engine 112 are to be applied for each communication path 106. For example, the communication network information 136 may store information about whether policing of throughput is to be applied to certain network elements in the communication network 102 or all network elements 104 in the communication network 102. Additionally, the communication network information 136 may store information about whether QoS balancing is to be applied to each network element 104. For example, the communication network information 136 may include information indicating that only certain network elements 104 are configured to be configured for QoS balancing.

Although the data source 114 is shown as being located on, at, or within the CSP computing system 110, it is contemplated that the data source 114 can be located remotely from the CSP computing system 110, such as on, at, or within the memory 124 of one or more network elements 104.

Figure 2:
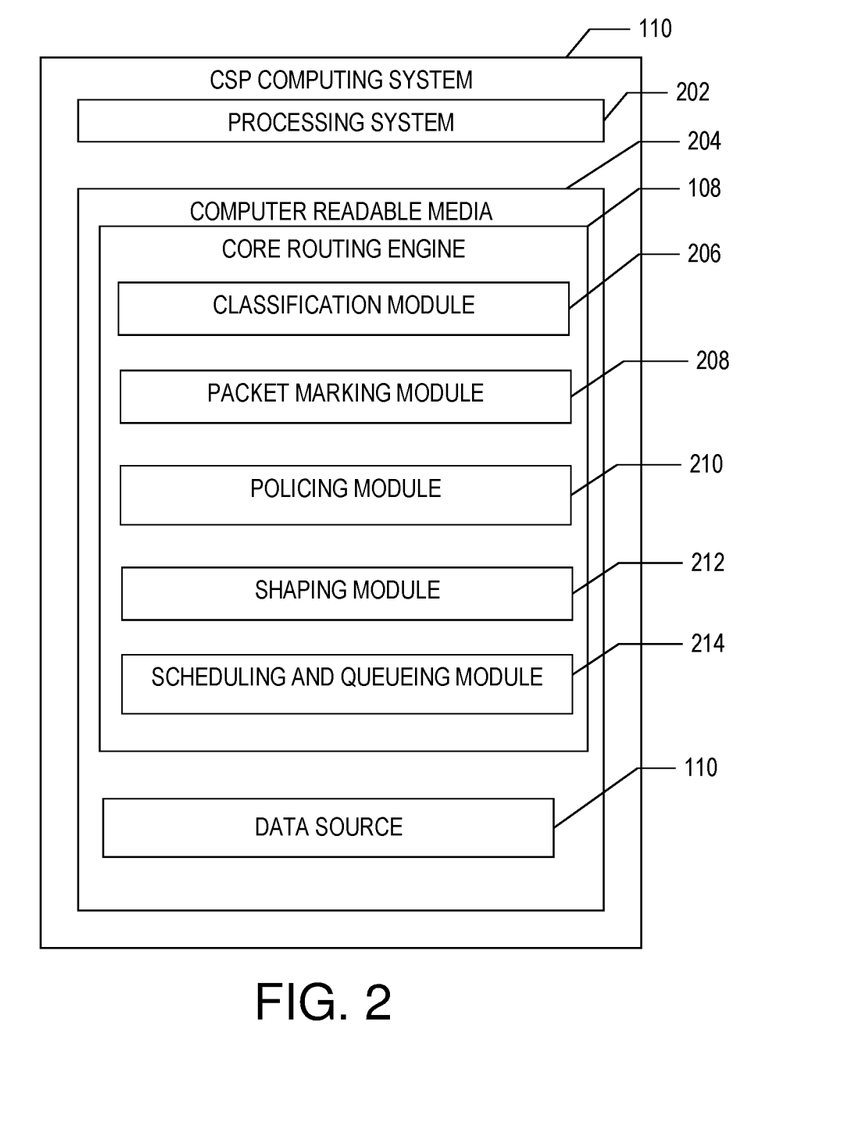
FIG. 2 depicts a diagram of an example communication service provider computing system according to one aspect of the present disclosure.

FIG. 2 is a block diagram depicting an example rules engine 112 executed on the CSP computing system 110. According to one aspect, the CSP computing system 110 includes a processing system 202 that includes one or more processors or other processing devices. A processor is hardware. Examples of such a computing system include one or more servers, personal computers, mobile computers and/or other mobile devices, and other computing devices. The CSP computing system 110 may communicate with the network elements 104 via wireless, wired, and/or optical communications.

According to one aspect, the CSP computing system 110 includes a computer readable media 204 on which the rules engine 112 and data source 114 are stored. The rules engine 112 includes instructions or modules that are executable by the processing system 202 to perform the features of the QoS management system 100 described herein.

The computer readable media 204 may include volatile media, nonvolatile media, removable media, non-removable media, and/or another available media that can be accessed by the CSP computing system 110. By way of example and not limitation, computer readable media 204 comprises computer storage media and communication media. Computer storage media includes non-transient storage memory/media, volatile media, nonvolatile media, removable media, and/or non-removable media implemented in a method or technology for storage of information, such as computer/machine readable/executable instructions, data structures, program modules, and/or other data. Communication media may embody computer readable instructions, data structures, program modules, or other data and include an information delivery media or system.

A classification module 206 determines, for each network element 104, how packets are to be classified by each network element 104 for implementing an assigned QoS for each communication path. The classification module 206 may also generate instructions to be used by each network element 104 for inspecting packets for applying a QoS in accordance with a protocol (e.g., DSCP, IP Precedence, 802.1Q, CS, etc.) of each packet. In one embodiment, the classification module 206 may also provide information to be used by each network element 104 for detecting malicious packets, such as those associated with denial of service (DoS) attacks, or worm viruses.

A packet marking module 208 determines, for each network element 104, how each incoming packet is to be interpreted for each communication path 106. For example, the packet marking module 208 may provide instructions to a network element 104 that packets marked with a particular tag indicating a 'best effort' QoS level should be routed through a certain queue 128 of that network element 104. As another example, the packet marking module 208 may also provide instructions for that network element 104 to re-mark (e.g., append a different tag) to certain packets so that the downstream network element 104 in that communication path may properly interpret the QoS and route the packet to its appropriate queue 128.

A policing module 210 develops one or more policing algorithms to be used by certain network elements 104 for ensuring that policies associated with the communication paths are adhered to. For example, the policing module 210 may determine for a particular communication path, a first network element 104 along the communication path that is configured to police packets to ensure that a maximum throughput rate for that communication path is not exceeded. Additionally, the policing module 210 may determine what actions are to be taken by each network element 104 in the event that the maximum throughput rate is exceeded, such as dropping additional packets that would cause the throughput rate to be exceeded, re-assigning the communication path to a lower priority, and/or buffering the packets until the throughput rate is no longer exceeded. As another example, the policing module 210 may instruct one network element 104, a subset of all the network elements 104, or all network elements 104 handling the communication path to police the communication path to ensure that the maximum throughput rate is not exceeded.

A communication path shaping module 212 develops certain algorithms to be used by each network element 104 to smooth out occasional periods of traffic congestion by delaying (e.g., buffering) packets for a period of time until the congestion is relieved. The shaping can be accomplished with singular and/or hierarchal policy maps that are each associated with the different QoS levels. For example, the communication path shaping module 212 may monitor the throughput of each communication path and when the throughput exceeds a certain specified level, commence buffering of the communication path until the throughput level goes below that level.

A scheduling and queuing module 214 develops certain algorithms to be used by each network element 104 to manage how incoming packets are scheduled for processing by each respective network element 104. Both scheduling and queuing can be done by class-based policies as well as via legacy algorithms such as class-based weighted fair queuing and low-latency queuing. The scheduling and queuing module 214 may generate a mapping algorithm that maps QoS levels provided by the CSP to those provided by each network element 104. For example, the scheduling and queuing module 214 may generate a mapping algorithm for a particular network element having queues conforming the DSCP queue mappings such that a 'best effort' QoS level is mapped to 'queue 14', while a 'premium' QoS level is mapped to queue 37' of the DSCP queue mappings of the network element. Additionally, the scheduling and queuing module 214 may dynamically map QoS levels to queues associated with each network element according to measured network parameters or other factors of the communication network that may change over time.

It should be appreciated that the modules described herein are provided only as an example of a computing device that may execute the rules engine 112 according to the teachings of the present invention, and that other computing devices may have the same modules, different modules, additional modules, or fewer modules than those described herein. For example, one or more modules as described in FIG. 2 may be combined into a single module. As another example, certain modules described herein may be encoded and executed on other computing devices, such as the network element used by the user.

Figure 3:
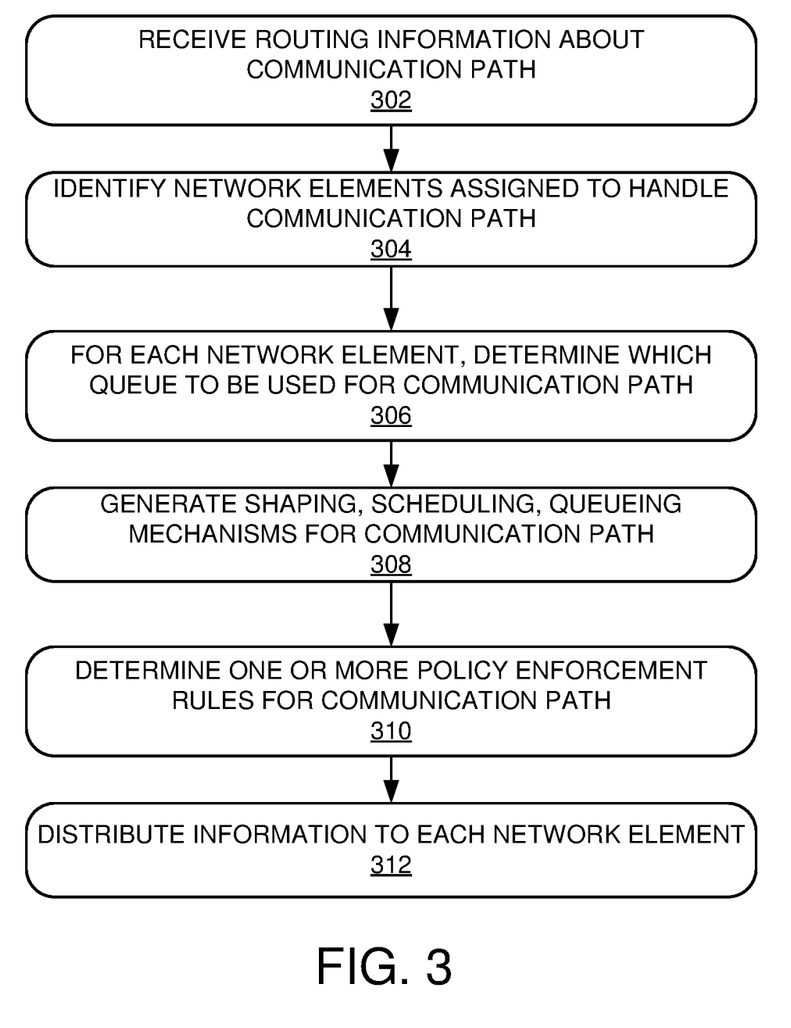
FIG. 3 is a flowchart depicting an example process that may be performed by the QoS management system according to one aspect of the present disclosure.

FIG. 3 illustrates an example process that may be performed by the rules engine 112 according to the teachings of the present disclosure.

In step 302, the rules engine 112 receives information about a communication path to be established for a customer communication device 108a, 108b. The routing information includes information about which network elements 104 are to handle the communication path and any terms of service to be associated with the communication path. For example, the terms of service associated with the communication path may include a specified QoS level and/or a maximum throughput rate negotiated for that communication path.

In step 304, the rules engine 112 identifies those network elements 104 in the communication network 102 that are assigned to handle the communication path. Next, for each network element 104 that is to handle the communication path, the rules engine 112 determines one of multiple queues 128 in its respective network element 104 that provides the communication path at the specified QoS level in step 306. In one embodiment, the rules engine 112 may modify (e.g., re-mark) the tag included in one or more packets according to a downstream network element 104 along the communication path. For example, a particular communication path having a 'best effort' QoS level may be processed at a certain queue level in one network element 104 while being processed in a different queue level in its downstream network element 104. The rules engine 112 therefore may input this information in the configuration file 126 sent to the network element 104 such that during operation, the network element 104 may modify the tag such that the downstream network element 104 may also process the packet at the 'best effort' QoS level.

In step 308, the rules engine 112 generates one or more shaping, scheduling, and/or queuing mechanisms for each network element 104 that may be used for managing how packets are queued through each network element 104. For example, the rules engine 112 may generate a shaping mechanism for one or more network elements 104 for managing how load sharing for each network element 104 is to be administered under differing load scenarios. As another example, the rules engine 112 may generate a singular and/or a hierarchal policy map that may be used by at least one network element 104 for buffering of each of its queues such that packets of multiple communication paths may be efficiently routed through its respective network element 104.

In step 310, the rules engine 112 generates one or more policy enforcement rules for each network element 104. For example, the rules engine 112 determines those network elements 104 configured to regulate a maximum throughput rate of the communication path, and generates a policy enforcement rule for at least one network element 104 to be used for ensuring that the throughput rate of that communication path does not exceed the maximum throughput rate.

In step 312, the rules engine 112 distributes the determined queue information, shaping mechanisms, scheduling mechanisms, queuing mechanisms, and policy enforcement rules to each network element 104 that is configured to handle that communication path. For example, the rules engine 112 generates a configuration file for each network element 104 including the queue information, shaping mechanisms, scheduling mechanisms, queuing mechanisms, and policy enforcement rules and transmits the configuration file 126 to its respective network element 104 such that its application 124 may configure its operation according to the parameters determined by the rules engine 112. The configuration file 126 may be transmitted to the network elements 104 in any suitable manner. For example, the rules engine 112 may automatically transmit (e.g., push) the configuration file 126 to the network elements 104 when the configuration filed 126 is generated. As another example, the rules engine 126 may store the configuration file 126 for each network element 104 in the data source 110 such that the configuration file 126 for the network elements 104 may be manually viewed and transmitted to their respective network elements 104 by a user. In this manner, the automatically generated configuration file 126 may be manually modified by the user to include any customized settings prior to transmitting the configuration files 126 to the network elements 104.

When the communication path is established, each network element 104 will decipher each packet received from either the customer communication device 108a, 108b or an upstream network element 104 and queue that packet according to the information stored in the configuration file 126.

The process described above continues throughout operation of the quality of service management system 100 for establishing other communication paths in the communication network 102. However, when use of the quality of service management system 100 is no longer needed or desired the process ends.

It should be appreciated that the process described herein is provided only as an example and that the quality of service management system 100 may execute additional steps, fewer steps, or differing steps than those described herein. For example, the steps 302 through 312 may be executed in any suitable order; that is, the steps as described in FIG. 3 are not limited to execution in any particular sequence. As another example, either of the steps 302 through 312 described herein may be executed by the CPS computing system 110 or may alternatively be performed by another computing system without departing from the spirit or scope of the present disclosure.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Figure 4:
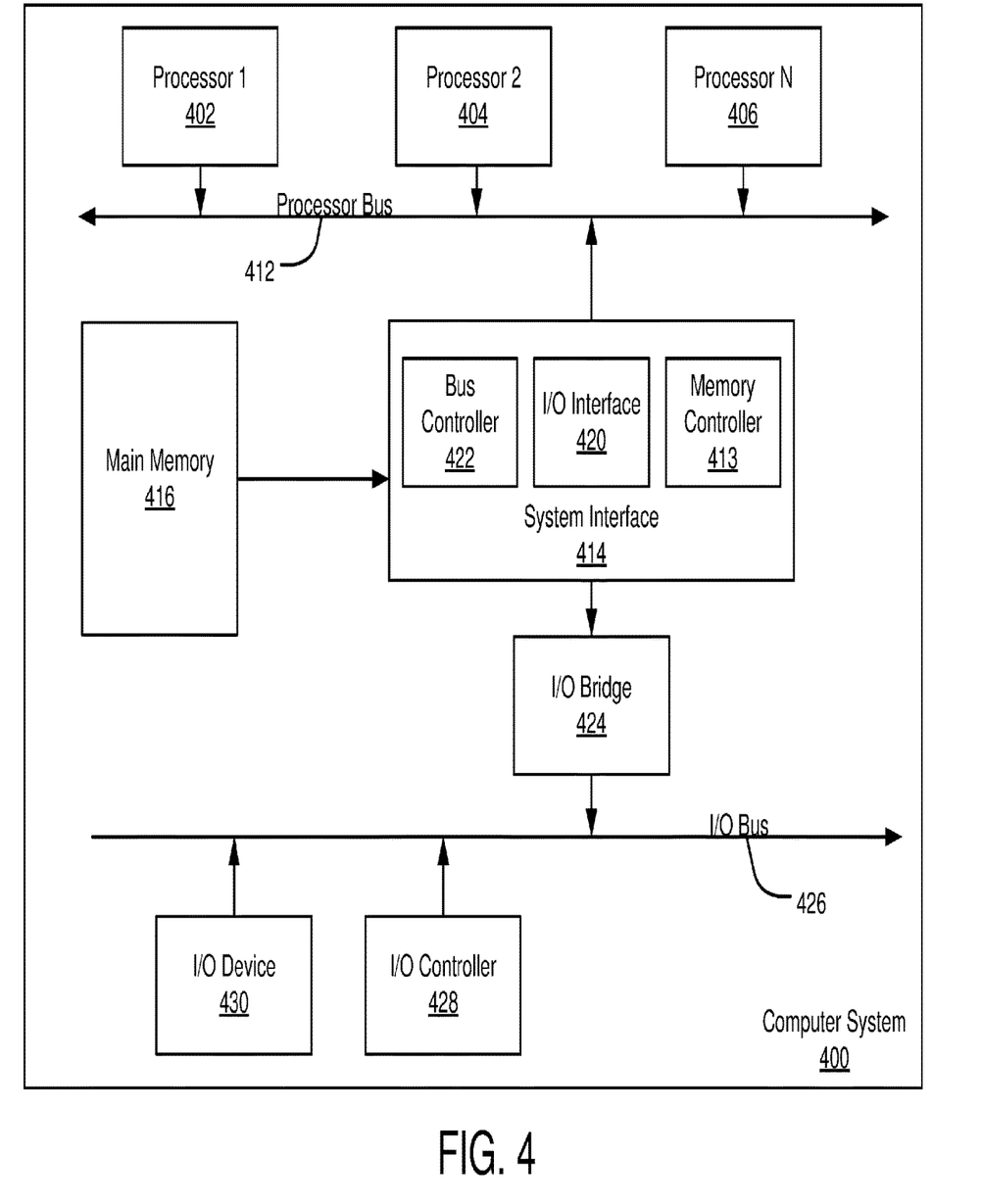
FIG. 4 illustrates an example computer system according to one embodiment of the present disclosure.

For example, FIG. 4 is a block diagram illustrating an example of a host or computer system 400 which may be used in implementing the embodiments of the present disclosure. The computer system (system) includes one or more processors 402-406. Processors 402-406 may include one or more internal levels of cache (not shown) and a bus controller or bus interface unit to direct interaction with the processor bus 412. Processor bus 412, also known as the host bus or the front side bus, may be used to couple the processors 402-406 with the system interface 414. System interface 414 may be connected to the processor bus 412 to interface other components of the system 400 with the processor bus 412. For example, system interface 414 may include a memory controller 413 for interfacing a main memory 416 with the processor bus 412. The main memory 416 typically includes one or more memory cards and a control circuit (not shown). System interface 414 may also include an input/output (I/O) interface 420 to interface one or more I/O bridges or I/O devices with the processor bus 412. One or more I/O controllers and/or I/O devices may be connected with the I/O bus 426, such as I/O controller 428 and I/O device 430, as illustrated.

I/O device 430 may also include an input device (not shown), such as an alphanumeric input device, including alphanumeric and other keys for communicating information and/or command selections to the processors 402-406. Another type of user input device includes cursor control, such as a mouse, a trackball, or cursor direction keys for communicating direction information and command selections to the processors 402-406 and for controlling cursor movement on the display device.

System 400 may include a dynamic storage device, referred to as main memory 416, or a random access memory (RAM) or other computer-readable devices coupled to the processor bus 412 for storing information and instructions to be executed by the processors 402-406. Main memory 416 also may be used for storing temporary variables or other intermediate information during execution of instructions by the processors 402-406. System 400 may include a read only memory (ROM) and/or other static storage device coupled to the processor bus 412 for storing static information and instructions for the processors 402-406. The system set forth in FIG. 4 is but one possible example of a computer system that may employ or be configured in accordance with aspects of the present disclosure.

According to one embodiment, the above techniques may be performed by computer system 400 in response to processor 404 executing one or more sequences of one or more instructions contained in main memory 416. These instructions may be read into main memory 416 from another machine-readable medium, such as a storage device. Execution of the sequences of instructions contained in main memory 416 may cause processors 402-406 to perform the process steps described herein. In alternative embodiments, circuitry may be used in place of or in combination with the software instructions. Thus, embodiments of the present disclosure may include both hardware and software components.

A computer readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 416. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A quality of service management system for a communication network, the system comprising:
   a computing system comprising at least one memory for storing a rules engine that is executed by at least one processor to:
      receive information associated with a communication path to be provided between communication devices, the communication path having an associated quality of service (QOS);
      identify one or more network elements to provide the communication path between the communication devices; and
      for each of the network elements:
         determine at least one queue that is configured to provide the communication path at the associated QoS; and
         transmit queue information associated with the determined queue to the network element,
      wherein the memory stores QoS mapping information for each of the network elements, the rules engine further executed to determine the queue according to the QoS mapping information associated with each respective network element.

2. The system as recited in claim 1, wherein each packet transmitted through the communication path includes a tag indicating the QoS.

3. The system as recited in claim 2, wherein the tag is generated by and appended to the packet by at least one of the communication devices.

4. The system as recited in claim 2, wherein the tag is generated by and appended to the packet by an ingress network element in the communication path.

5. The system as recited in claim 1, wherein the rules engine is further executed to: determine which of the one or more network elements are configured to enforce a policy associated with the QoS; generate a rule to be associated with the policy; and transmit the rule to at least one of the one or more network elements that are configured to enforce the policy.

6. The system as recited in claim 5, wherein the policy comprises a maximum throughput rate of the communication path.

7. The system as recited in claim 1, wherein the rules engine is further executed to, for each network element: schedule a priority level for at least two queues of the network element; and transmit the scheduled priority of the at least two queues to the network element.

8. A method comprising:
   receiving, using at least one processor executing instructions stored in at least one memory, information associated with a communication path to be provided between communication devices on a communication network, the communication path having a quality of service (QOS);
   identifying, using the processor, one or more network elements to provide the communication path between the communication devices; and
   for each of the network elements:
      determining, using the processor, at least one queue that is configured to provide the communication path at the associated QoS; and
      transmitting, using the processor, queue information associated with the determined queue to the network element; and
   determining the queue according to QoS mapping information associated with each respective network element.

9. The method as recited in claim 8, further comprising appending a tag to each packet transmitted through the communication path, the tag indicating the QoS of the communication path.

10. The method as recited in claim 9, further comprising generating and appending the tag by at least one of the communication devices.

11. The method as recited in claim 9, further comprising generating and appending the tag by an ingress network element in the communication path.

12. The method as recited in claim 8, further comprising: determining which of the one or more network elements are configured to enforce a policy associated with the QoS; generating a rule to be associated with the policy; and transmitting the rule to at least one of the one or more network elements that are configured to enforce the policy.

13. The method as recited in claim 8, wherein the rules engine is further executed to, for each network element: schedule a priority level for at least two queues of the network element; and transmit the scheduled priority of the at least two queues to its respective network element.

14. Code implemented on a non-transitory, computer-readable medium, when executed by at least one processor, operable to perform at least the following:
   receive information associated with a communication path to be provided between communication devices on a communication network, the communication path having an associated quality of service (QOS);
   identify one or more network elements assigned to provide the communication path between the communication devices;

for each of the network elements:
    determine at least one queue that is configured to provide the communication path at the associated quality of service; and
    transmit, using the processor, queue information associated with the determined queue to the network element; and
determine the queue according to QoS mapping information associated with each respective network element.

15. The code as recited in claim 14, further executed to append a tag to each packet transmitted through the communication path, the tag indicating the QoS of the communication path.

* * * * *